(12) United States Patent
Bernhardt et al.

(10) Patent No.: US 6,496,208 B1
(45) Date of Patent: Dec. 17, 2002

(54) METHOD AND APPARATUS FOR VISUALIZING AND EXPLORING LARGE HIERARCHICAL STRUCTURES

(75) Inventors: Jeff Bernhardt, Woodinville; Usama M. Fayyad, Mercer Island, both of WA (US)

(73) Assignee: Microsoft Corporation, Redmond, VA (US)

( * ) Notice: Subject to any disclaimer, the term of this patent is extended or adjusted under 35 U.S.C. 154(b) by 0 days.

(21) Appl. No.: 09/300,932

(22) Filed: Apr. 28, 1999

Related U.S. Application Data

(60) Provisional application No. 60/099,685, filed on Sep. 10, 1998.

(51) Int. Cl.$^7$ .................................................. G06F 3/14
(52) U.S. Cl. ........................ 345/853; 345/764; 345/804; 345/781; 345/805
(58) Field of Search ................................. 345/853, 835, 345/804, 841, 781, 968, 805, 767, 764, 733, 765

(56) References Cited

U.S. PATENT DOCUMENTS

| | | | | |
|---|---|---|---|---|
| 5,295,244 A | * | 3/1994 | Dev et al. ..................... | 345/357 |
| 5,309,555 A | * | 5/1994 | Akins et al. ................. | 395/330 |
| 5,528,735 A | * | 6/1996 | Strasnick et al. ........... | 395/127 |
| 5,571,965 A | * | 11/1996 | Rogers et al. ................ | 73/462 |
| 5,572,640 A | * | 11/1996 | Schettler ...................... | 395/140 |
| 5,631,825 A | | 5/1997 | van Weele et al. ......... | 345/339 |
| 5,761,429 A | * | 6/1998 | Thompson .................. | 709/224 |
| 5,793,974 A | * | 8/1998 | Messinger ................... | 709/224 |
| 5,801,702 A | * | 9/1998 | Dolan et al. ................. | 345/357 |
| 5,958,012 A | * | 9/1999 | Battat et al. ................. | 709/224 |
| 6,008,814 A | * | 12/1999 | Baldwin et al. ............. | 345/427 |

FOREIGN PATENT DOCUMENTS

| | | |
|---|---|---|
| EP | 029121 A1 * | 5/1981 |
| EP | 0 529 121 A1 | 3/1993 |
| EP | 0 609 030 A1 | 8/1994 |
| EP | 0 694 829 A1 | 1/1996 |
| JP | 0 4318684 | 10/1992 |

OTHER PUBLICATIONS

Harsha P. Kumar, Catherine Plaisant and Ben Shneiderman, Browsing Hierarchical Data with Multi–level Dynamic Queries and Pruning, International Journal of Human–Computer Studies, vol. 46, No. 1, XP002088976, pps. 103–124 (1997).

* cited by examiner

*Primary Examiner*—Kristine Kincaid
*Assistant Examiner*—Thomas T. Nguyen
(74) *Attorney, Agent, or Firm*—Watts, Hoffmann, Fisher & Heinke, Co., LPA

(57) ABSTRACT

Method and apparatus for displaying and navigating data organized in the form of a graph structure (hierarchy or network) is presented. The invention has application for displaying a system of interconnected nodes such as a graph, a network, an organizational chart, a flowchart etc. wherein data or information is associated with nodes of the system. A user interface is implemented as an ActiveX control having a viewer component for displaying and navigating graph structur (for example a data mining model over data records or a directory structure over a set of files). The viewer component updates the contents of related windows that display different aspects of the components (nodes) of the data structure. A thumbnail window presents the user with an overview of the data structure. A layout window presents a more detailed view of part of the graph structure. Other windows display context and detailed properties associated with particular selected nodes. One instance of the invention is used for displaying structure of a database classifier which organizes data in a tree. A tree viewer maintains a depiction of the entire graph (or tree) in the Thumbnail window and depicts a detailed portion of the graph in a larger layout window. The user can move the mouse pointer over either the thumbnail or the layout window and by mouse actuated inputs can control the manner in which the window depicts the tree structure. Color coding of properties of the structure being displayed, along with auxiliary detail windows for displaying values and histograms, can be used to quickly navigate a large structure and locates zones of interest within it.

4 Claims, 6 Drawing Sheets

METHOD AND APPARATUS FOR VISUALIZING AND EXPLORING LARGE HIERARCHICAL STRUCTURES

CROSS REFERENCE TO RELATED APPLICATIONS

The present patent application claims priority of co-pending U.S. Provisional patent application serial No. 60/099,685 entitled "Method and COM Control for visualizing and Exploring Large Hierarchies of Trees of Information" which was filed in the United Sates Patent and Trademark Office on Sep. 10, 1998 pending.

FIELD OF THE INVENTION

The present invention concerns data visualization wherein structure has been imposed on data and a means of displaying the structure is needed. Traditional methods for displaying structures (such as hierarchies) are difficult for people to use when the structures get large.

BACKGROUND ART

Data reduction schemes such as those used in the mining of data from a large database impose a structure onto the data to better understand that data. Often a tree (or hierarchical) representation of the data is provided. A tree representation can often ease the viewing, accessing or understanding of the data represented by the tree. Tree structures are particularly convenient for separating large databases into segments or subsets of data. A set of files in a computer system are usually also represented as a hierarchy of directories with the leaves being individual files. This is also true for books in a library catalog system, and so forth. In general a tree has one top level or "root" node which can have two or more branches emanating from it. The branches represent some logical separation of the data. Each of these branches ends in another node, which can in turn have branches leaving from it, or the node can be a termination point or "leaf" of the tree (no more branches). Examples of data structured as a tree include the directory structure of a computer file system, a database table representing a "bill-of-materials" relationship, and the organization chart of a corporation. Examples from data mining include decision trees for classification and hierarchies of clusters (segments) generated from a hierarchical agglomerative clustering algorithm or a similar method.

Other examples of structures that are used to impose order to a large data set are networks or graphs. These structures do not have a single root but do have nodes that are interconnected by edges. Local area and wide area networks are examples of structures containing data which can conveniently depicted as a graph of nodes indicating for example nodes on a network. Such a graph could be used to indicate traffic on the network wherein data passing though a transmission node would be represented as data within a node of the graph.

In data mining, especially in building decision trees for prediction over a database, it is frequently the case that a very large tree is produced. An example of a decision tree for use in data mining is disclosed in copending U.S. patent application Ser. No. 08/982,760 entitled "Method and Apparatus for Efficient Mining Classification Models from Databases" to Chaudhuri et al which is assigned to the assignee of the present invention. Viewing an entire tree or browsing the data using the model extracted (the tree) is very challenging when the tree is large (has many nodes). Most prior art systems for displaying data structures such as trees display the tree and then zoom in and out to show either smaller or larger portions of the tree. These prior systems make it difficult to browse the tree structure in detail, while continuing to provide the user a context of what portion of the tree structure is being viewed.

Because of the hierarchical branching inherent in a typical tree structured data set, the "width" of the tree tends to increase exponentially with the "depth". For example, a balanced tree that has on average 4 branches per node will have 4 nodes at the $2^{nd}$ level of the hierarchy, 16 nodes at the $3^{rd}$, 256 nodes at the 5, and $4^n$ at the nth level.

Traditional methods for displaying a tree in a user interface use an equally sized object for each node in the tree. The tree can be laid out graphically as a network of connected objects in a window with scroll bars. Another example of a prior art tree representation is the hierarchy of files and directories displayed by the Microsoft Windows Explorer program. In both of these examples provision must be made to collapse or expand a node in order to make the navigation of a large unwieldy tree manageable.

For certain situations, such a tree may need to be seen in its entirety (fully expanded). If the tree is scaled down so that it can be viewed completely at one time, then not much useful information can be shown along with the nodes of the tree. If the entire tree is laid out so that usable information can be shown on each node, then certain problems arise. When the top of the tree is viewed, the distance between the high level nodes can become so great that they are of no use. When the bottom of the tree is put into view, the lower level nodes become a tangle of seemingly disconnected information (it is difficult to see the relationships between the nodes because connections to the parent nodes cannot be seen).

FIGS. 1 and 2 illustrate these problems. FIG. 1 depicts different visual views of a large amount of data in the form of a tree. One view depicts data nodes near a top (left side in FIG. 1) and a second view depicts a different set of data nodes near a base or bottom (right side of FIG. 1) of the data tree. A scroll bars are used to navigate the tree structure that is displayed in the scrollable window. FIG. 2 is an example of a fully expanded directory structure depicted by Windows Explorer where all connections to the higher level, owner directories have been lost.

SUMMARY OF THE INVENTION

The present invention concerns a method for enabling effective browsing and examination of large amounts of data that are organized or classified in a data structure. Many of the problems that have been experienced trying to explore and/or view large amounts of data are overcome by a novel navigation and rendering scheme constructed in accordance with the invention.

Two simultaneously viewable windows are displayed for a user. Using the example of a data tree, an overview of the entire tree is depicted in one window and only a portion of the tree is displayed in a second window. The second window shows individual nodes and interconnections and the first overview window depicts the entire tree in a way that makes traversal of the information in the tree intuitive to the user.

One use of the invention is for viewing a decision tree produced by a data mining system such as the data mining system disclosed in co-pending U.S. patent application Ser. No. 08/982,760 entitled "Method and Apparatus for Efficiently Mining Classification Models from Databases." Another representative use of the invention displays and navigates a file structure maintained by a computer operating system. Generally, the invention has application for displaying and system of interconnected nodes such as a graph, a network, an organizational chart, a flowchart etc. wherein data or information is associated with nodes of the system.

Use of color gradients helps the user identify trends or anomalies in the data by visualizing the tree as a whole. In general, a property is associated with a clor, and the color intensity can visually represent the value of the property (e.g. red being high, yellow being low). An exemplary embodiment of the invention is implemented as an ActiveX control with a user interface suitable for viewing and exploring large trees.

One exemplary embodiment of the invention includes a method for displaying data as a tree data structure. A user interface is painted by a tree rendering component that allows intuitive navigation and interpretation of the tree structure. The tree rendering component updates two related windows, a layout window and a thumbnail window. The tree rendering component maintains a structure of a tree depicted in the thumbnail window and depicts a portion of the entire tree in the layout window. The use of side by side windows, one of which shows the whole tree and another of which shows a portion of the tree allows easier user visualization of the data characterized by the tree.

The exemplary embodiment of the invention also conveys additional information in other windows (or window panes of the main window) on a viewing monitor. In accordance with one embodiment, a path window displays as text a sequence of concatenated decision steps required to reach a given node in the data structure. It is a textual summary of the context. Additionally, the user can select a given node that is displayed in the layout window and a detail window itemizes information about the contents of the selected node. The detail window can include a histogram of the values of a variable or score of interest. In use of the invention with a database classifier such a window could further itemize different categories of data that satisfy the logic leading to a particular node of the data structure.

These and other objects, advantages and features of the invention are further understood from the detailed description of an exemplary embodiment of the invention which is described in conjunction with the accompanying drawings.

DETAILED DESCRIPTION OF AN EXEMPLARY EMBODIMENT OF THE PRESENT INVENTION

An exemplary embodiment of the present Invention is implemented as an ActiveX computer control component 10 that includes a data viewer component 12 for displaying data structures on a viewing screen such as a computer screen 147 by supplying appropriate data for use by the comput-computer operating system that updates the screen display.

The techniques for implementing Active X components by means of COM object interfaces are known in the prior art. A discussion of COM object interfaces is contained in the book "Inside COM" by Dale Rogerson, Microsoft Press copyright 1997. Although the data viewer component disclosed in the application displays data as a tree structure it is appreciated that other data depictions such as graphs and networks could be displayed using the Active X components 10. In the discussion that follows, data depiction and data structure are used interchangeably.

Figure 3:
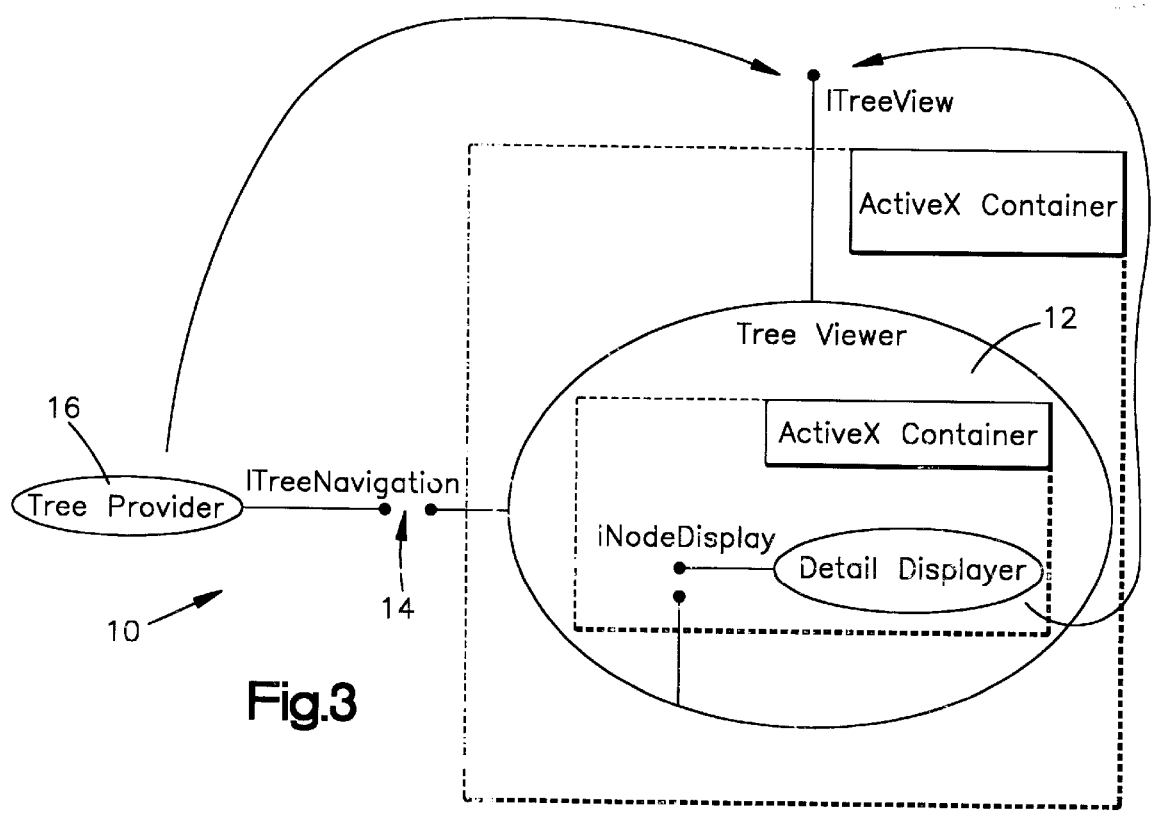
FIG. 3 is a high level architecture of a data displaying system constructed in accordance with the present invention.
Figure 6:
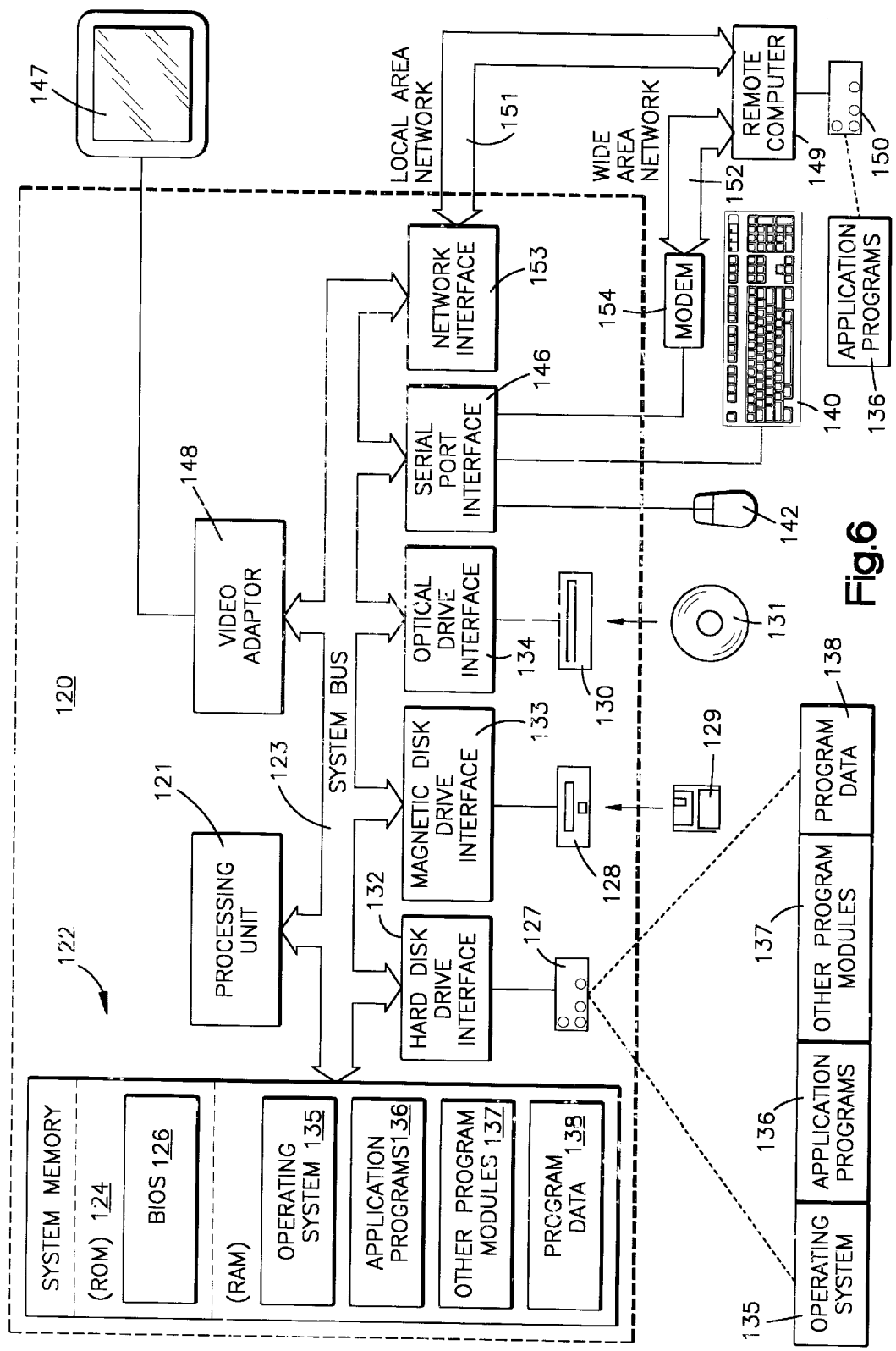
FIG. 6 is a schematic of a computer system for implementing the exemplary embodiment of the invention.

Practice of the invention allows a user to better visualize and navigate a data structure derived from a data source such as a large database stored on multiple (possibly distributed) memory devices. A user Interface 20 (FIG. 4) shows an example of operation of the data viewer, i.e. a display on a viewing screen such as a computer monitor 147 (FIG. 6). Within a frame window, the ActiveX implementation of the viewer sets up four related windows 30–33 to help the user navigate the data structure from the data source. These four windows 30–33 are identified in FIG. 4 as a layout window 30, a thumbnail window 31, a path window 32, and a details window 33. The data viewer component 12 is coupled by means of an ITreeNavigation COM interface 14 to a tree provider component 16. The tree provider 16 maintains the structure of a tree 18 depicted in the layout window 30 and provides all contextual information about the tree. By responding to some simple generic requests from the tree viewer 12, the tree provider 16 draws and navigates the tree. The tree viewer component 12 is unconcerned with the type or meaning to the tree being drawn. The tree provider 16 also supplies a Detail Displayer ActiveX control for displaying detailed provider specific information about individual nodes within a tree. FIG. 3 shows the high level architecture of how the tree viewer 12 interfaces with the tree provider 16 as a COM interface 14. The results of the cooperation between the tree provider and the tree viewer is an ItreeView interface to the operating system.

The present invention has particular utility for use in characterizing data contained in a database having many records stored on multiple, possibly distributed storage devices. Each record has many attributes or fields which for a representative database might include age, income, number of children education level, marital status etc. Such data can be obtained, for example, from census data gathered from many people in response to a survey. One goal of the invention is to help a user to visualize the contents of the database once it has been classified by means of a classifier scheme such as the scheme disclosed in the above mentioned patent application to Chaudhuri et al which is incorporated herein by reference.

Thumbnail to Layout Relationship

The display and operation of the Thumbnail window 31 is closely tied to the Layout window 30. The relationship between the two is similar to the movement co-ordination between the display in a client window in response to a user actuation of a scrollbar. The Thumbnail view shows a miniature outline of an entire tree 18. The Layout view shows a full size representation of a portion 18a of the tree (a sub-tree). A raised area control component 40 within the Thumbnail view acts much like the "thumb" of a normal scollbar and will hereinafter referred to as the thumb 40. The position of this thumb 40 over the miniature view of the tree 18 determines the portion 18a of the tree (sub-tree) that is shown in the Layout view. Under most circumstances, the sub-tree under the thumb is completely visible within the Layout window because the size of the thumb is determined by the largest sub-tree that can be viewed in the layout window 30.

Navigation with the Thumbnail

The Thumbnail view's rendering includes a raised control component or thumb 40 which can be moved to a specific region of the miniature tree 18 simply by moving the cursor over a portion of the tree and clicking on another portion 42 of the tree. Additionally, the thumb 40 can be moved incrementally by clicking on the thumb with the pointing device. While the cursor is positioned over the thumb, the cursor (not shown) changes shape to indicate the direction of incremental movement that a user actuated click of the mouse or other pointing device will produce. As the raised area control component 40 is moved in this manner, its size is changed to indicate the set of nodes in the subtree that can be fit in the main layout window. It is appreciated that other bound shapes of indicators could be used to give a relative indication of data displayed in the layout window to the entire tree structure.

Drawing the Layout Window

The sub-tree 18a selected by the raised area of the Thumbnail view is drawn at a larger scale as a Layout view in the layout window 30. The sub-tree is drawn left to right where the leftmost node represents the highest point in the tree outlined by or encompassed by the borders of the thumb 40 of the thumbnail view 18. (This node is a common parent of all other visible nodes depicted in the layout view.) In the figure the tree is laid out in left to right order to include descritptive text naturally. The tree may be laid out in any other fashion by the tree rendering component.

Nodes are drawn as colored ellipses 44 with branches shown as lines 46 leaving the right side of a node and connecting to the node's children. The color of the node (as well as the corresponding region of the Thumbnail) is determined by a score that is reported for the node by the tree provider 16. The score can be changed via some user interface controls, and the tree provider accordingly can expose different scores for each node. A text label is draw within the ellipse of the node, and a text label for an edge is drawn on any connecting line. The tree provider component 16 supplies these labels.

As is well known, a standard video display monitor is wider than it is tall. Tree structures having interconnected nodes are best displayed on such a monitor if the tree is displayed 'sideways'. If the leftmost node is the tree root, then no edge leads to the node on the left hand side of the display. If the leftmost node is an interior node, then an edge is connected to the leftmost node. The text that is rendered within the layout window for conveying information about the tree nodes is also displayed horizontally next to the nodes and edges of the tree.

The visible sub-tree 18a is drawn within the Layout window as if it was a complete tree. Children nodes that are not included within the sub-tree and will not be visible are not considered when spacing the rightmost visible nodes. The Layout view draws the visible sub-tree to a given scale. The window scale can be changed providing a zoom-in or zoom-out effect.

Navigation within the Layout Window

The tree can also be navigated from within the Layout view. Clicking on an edge line 46 will change the display to show a sub-tree starting with the child node that the edge line points to. This includes any half-lines 46a that point toward non-visible children. (lines on the right of the rightmost nodes.) One exception is that clicking on an edge 46b emanating from the left of the leftmost (top) node will move the display up one level in the tree.

One of the nodes within the Layout view can be put into focus. A node in focus is drawn differently to indicate selection.

Details of Layout/Thumbnail Interaction

The Thumbnail and Layout windows work together to determine the size of the Thumbnail's scroll thumb and thus the size of the sub-tree visible within the Layout view. The following steps describe this interaction: A thumbnail component of the tree viewer 12 is instructed (by a navigation or a COM interface call) to put a sub-tree starting at a particular node into view. The Thumbnail asks the Layout for the dimensions of the largest possible tree that it can fit without clipping inside its window. These numbers are based upon the dimensions of the Layout window, the current Layout scaling factor, and some inherent metrics about the relative sizes and relative positions of the object used to render a tree.

The Thumbnail control then knows the maximum depth or width that can be shown, and traverses down the tree starting from the chosen node. It keeps track of the depth traversed and the width of the sub-tree at the given depth and stops traversing down before one of the maximums is surpassed. The Thumbnail now can identify the visible sub-tree, and it positions its thumb (raised region) accordingly on the miniature tree 18. The Layout view gets the depth of the visible sub-tree 18a from the Thumbnail and draws the tree.

The Path Window

The Path window 32 shows a concatenation of the decision criteria needed to reach the Layout window's leftmost visible node by working down from the root of the entire tree. The tree provider 16 supplies a description of each step along the way. The Path provided in this window gives the user a context when viewing a nested sub-tree 18a since it gives information about the leftmost data node of that subtree.

The Details Window or Windows

Figure 4:
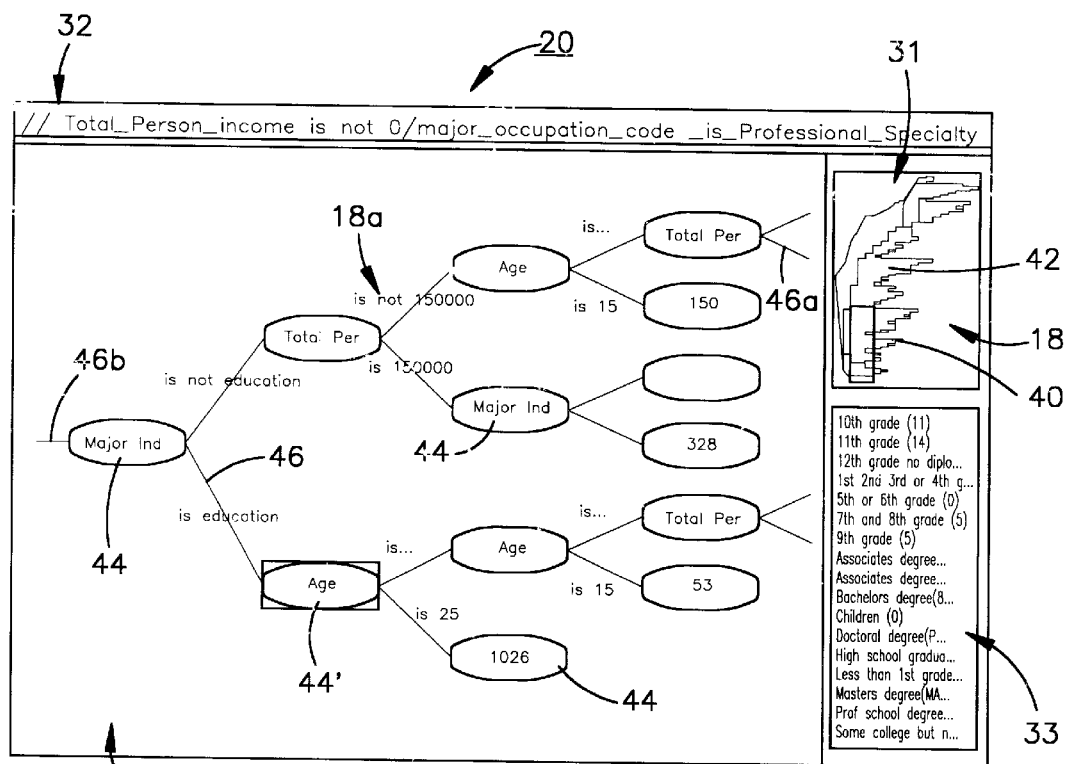
FIGS. 4 and 5 are alternate depictions illustrating different aspects of the invention for use in displaying data structures.

When one of the nodes is selected for focus within the Layout view, the Details window can show detailed provider specific information about the node. To make this happen, the tree provider 16 supplies an ActiveX control that supports the INodeDisplay interface of a component for displaying node detail. This provider-supplied control will be hosted within the Details window. The tree viewer uses the INodeDisplay interface to alert a provider object that the details for a specific node are to be shown when a particular node is in focus. In FIG. 4 the node 44' is in focus. This node was selected by the user moving the cursor over the node and right clicking on the mouse 142 (FIG. 6) or other suitable pointing device.

Visualizing Tree Structure via Color Gradients

Figure 5:
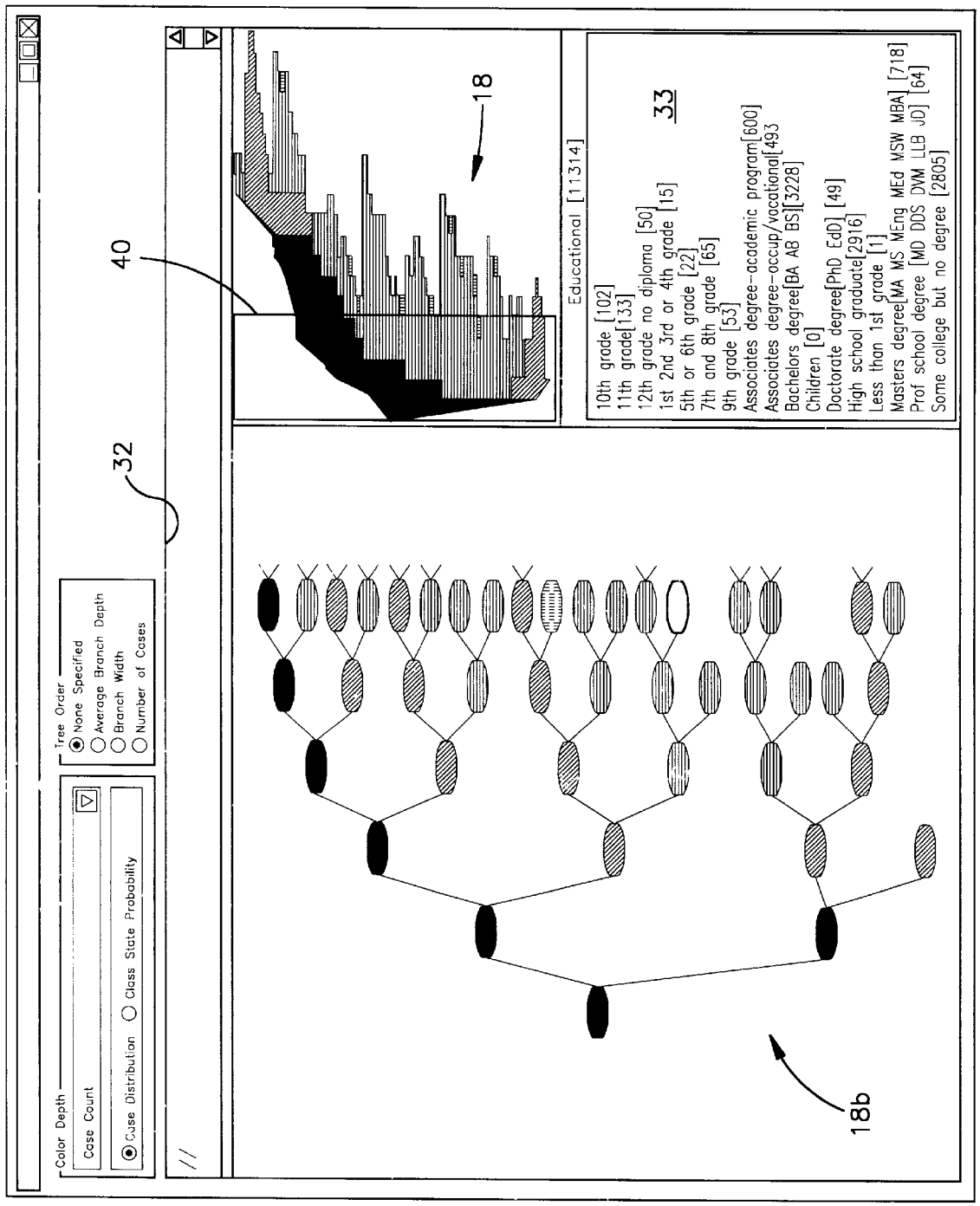

The tree provider 16 has control over the semantics for the "score" that it reports for a node to the tree viewer. This score (between 0 and 1) is used by the tree viewer to set the illumination of the color of each node's representation in the Layout view and the miniature tree outline for nodes in the thumbnail window. The FIG. 5, the tree viewer illustrates a decision tree that classifies education level for a large sample of census data. The score reported for nodes shown in FIG. 5 is relative to the number of data records for individuals that conform to or fit a given edge's condition. Using this score, the tree shows dark "veins" of data concentration since a score is based upon the number of records relative to the entire database represented by a node and the children of that node.

Figure 5A:
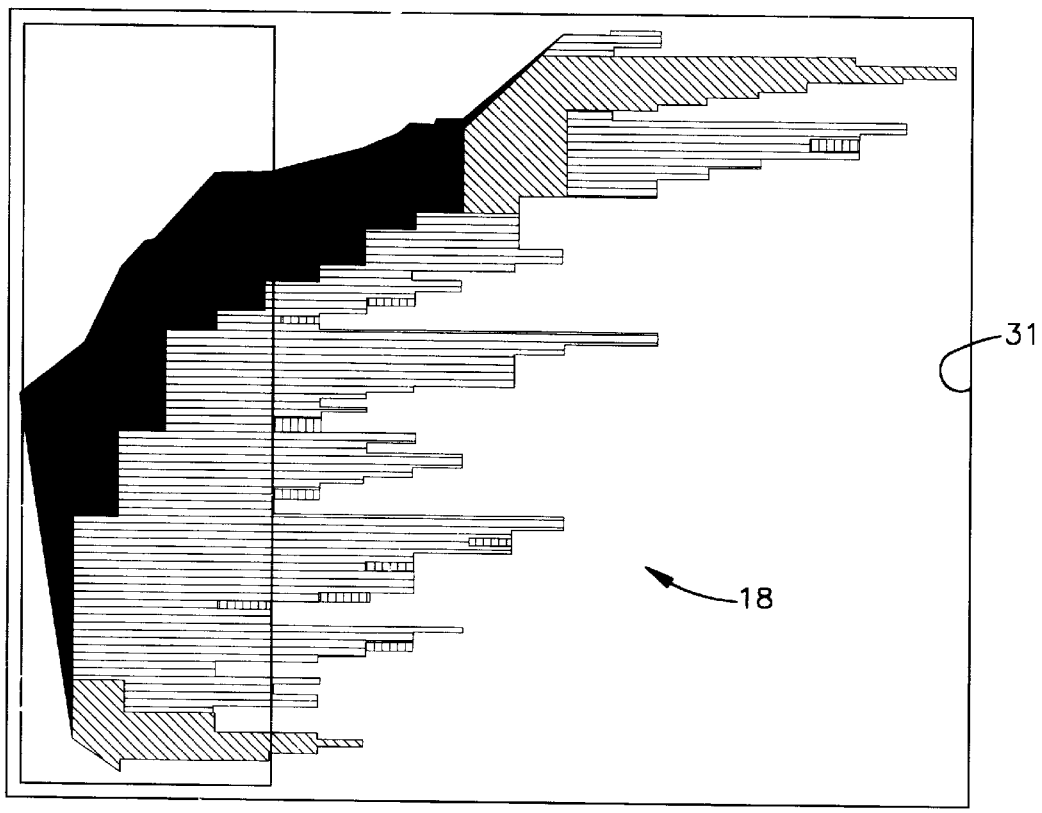
FIG. 5A is a enlarged view of a thumbnail window for displaying a data structure in an overview fashion.

FIG. 5 and FIG. 5A illustrate by means of cross hatching in the drawings use of the color coding to depict data structure information. The control component 40 is located over the leftmost portion of the tree 18. As seen in the path window 32 the entire tree is chosen so that the leftmost node in the window 30 is the tree root node and has no edge entering the node from the left. Each of the nodes of the window 30 has been color coded in accordance with a scale factor based on the number of data records from the database classified in a given node. Branches in the tree are based on attribute values of the data records in the database from which the records are obtained and therefore as one travels away from the root node in the tree the score or number of records decreases. In the depiction of FIGS. 5 and 5A the largest number of records is indicated with a 'black' cross hatching, the second highest with a 'green', then a 'blue' a 'violet' and finally a 'white'.

The score for the node as determined by the tree viewer need not be based on an absolute number but instead can be chosen as a relative indication. In the tree classifier of the previously identified patent application to Chaudhuri et al, for example, the nodes of the tree correspond to a classification system that can result in records having the same attribute satisfying different branches of the classifier tree. The color of the nodes could be used to indicate therefore a probability of a given node satisfying certain facts rather than an absolute tabulation of a number of data records. Using an example from a database classifier, the color coding could signify probability of a family having a child in college even though the branching of the tree does not branch on that attribute value.

Other properties could be color coded to convey information about the data structure. Instead of a classifier of a database, the tree structure could depict a directory structure of a computer file system. In that circumstance, in addition to showing the size of the files within the directory, a use somewhat akin to the one described above for a database classifier, the color coding provided by the Tree provider could indicate how recently files in the directory structure have been opened, frequency of use, permission levels of files with the file structure or any other property that could be turned into a score relative to other nodes in the hierarchy of files. Similarly, in a graph structure or network the color coding could indicate data traffic or instances of data retransmission or error occurrences at a particular node of the network.

Computer System

Figure 1:
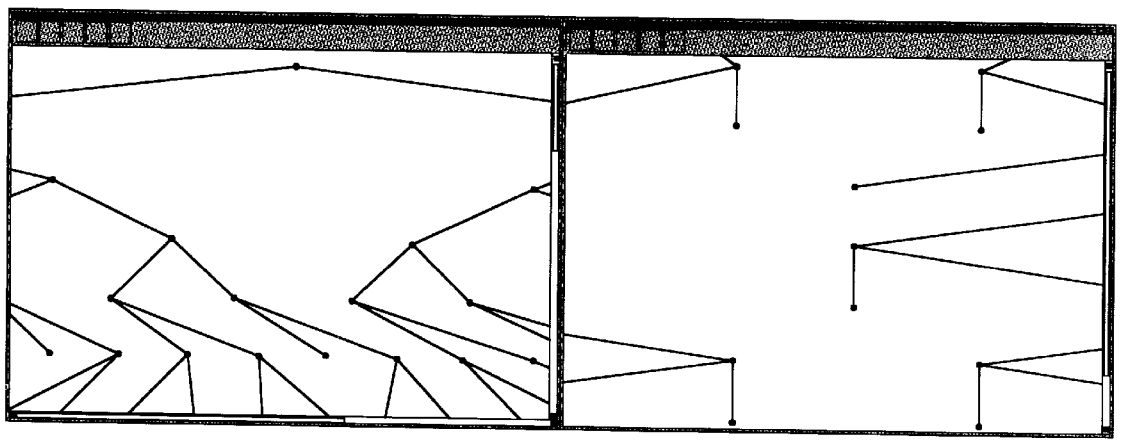
FIGS. 1 and 2 are prior art illustrations of data depictions.
Figure 2:
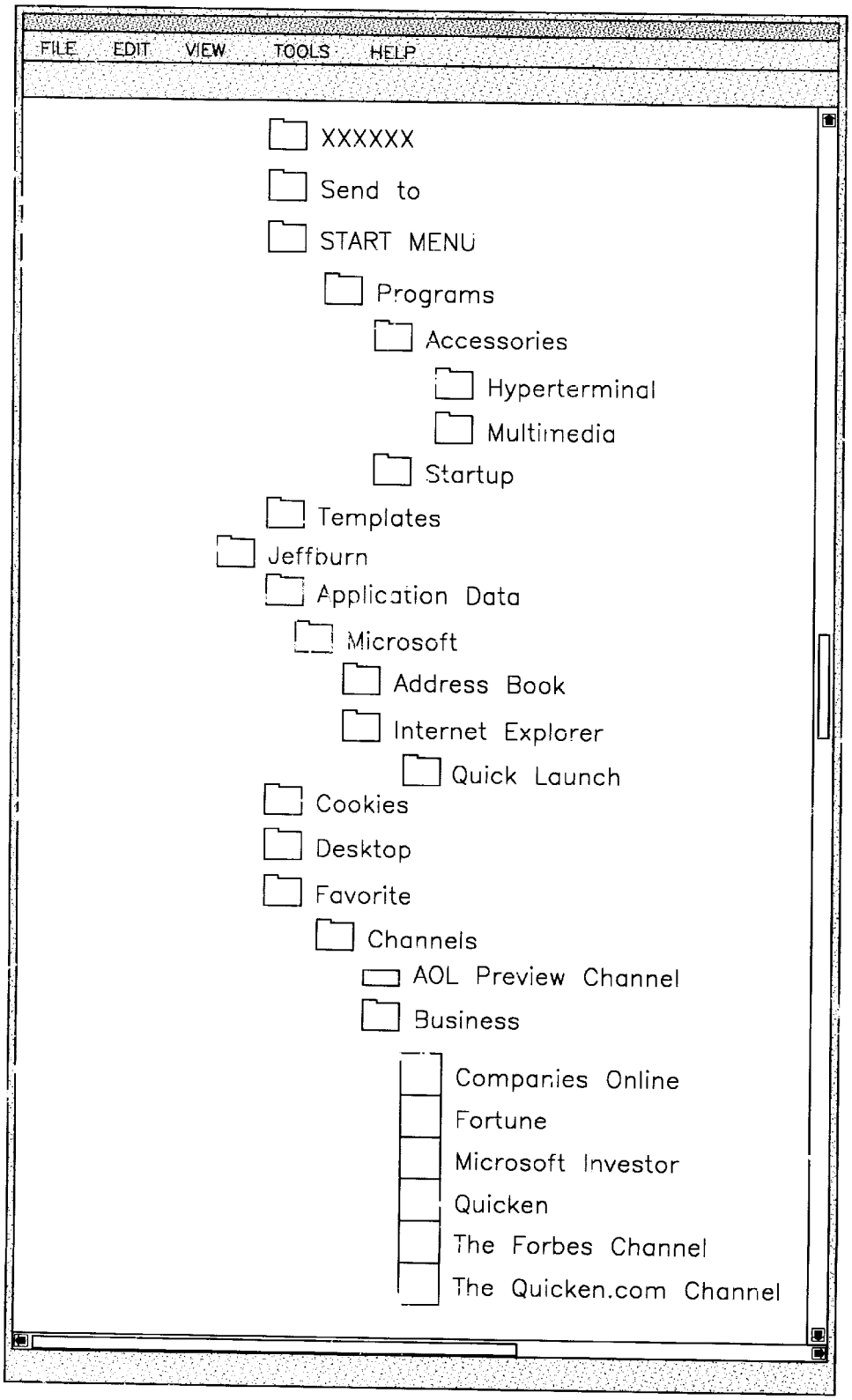

With reference to FIG. 1 an exemplary data processing system for practicing the disclosed invention includes a general purpose computing device in the form of a conventional computer 120, including one or more processing units 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures.

The system memory includes read only memory (ROM) 124 and random access memory (RAM) 125. A basic input/output system 126 (BIOS), containing the basic routines that helps to transfer information between elements within the computer 120, such as during start-up, is stored in ROM 24.

The computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 23 via an interface, such as a video adapter 148. In addition to the monitor, personal computers typically include other peripheral output devices (not shown), such as speakers and printers.

The computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 46. In a networked environment, program modules depicted relative to the computer 120, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

What is claimed is:

1. Apparatus for displaying a data structure which is based on information contained within a data source comprising:
   a data classifier for classifying the information from the data source and building a data structure from the information;

a display component communicating with the data classifier for rendering a visual depiction of the data structure by displaying two related renderings of the data structure, a first overview depiction of the data structure and a second detail depiction of a subportion of the overview portion wherein the detail depiction is displayed as a plurality of interconnected nodes that convey information about a data set that defines an associated node; said display component also defining a highlighted region of the overview depiction and depicting correspondingly different portions of the data structure in the detail depiction based on the highlighted region; and a control for allowing a user to communicate with the display component to adjust the highlighted region and thereby adjust the visual rendering of the data structure; and means for displaying a third related rendering comprising a textual description of the nodes that make up the data structure;

said display component adjusting a size of the highlighted region based upon the data contained within the portion of the data structure represented by the highlighted region.

2. The apparatus of claim 1 additionally comprising means for depicting additional text information for a node that is highlighted in the detail depiction.

3. The apparatus of claim 2 wherein the display renders a detail window for displaying the detail depiction and separately renders an additional detail window containing information concerning nodes in the detail window.

4. A method for displaying data comprising the steps of providing a user interface for displaying and navigating a data structure characterized by a decision tree representing data from a database by:

rendering an overview depiction of a first portion of the decision tree in one region of a video display;

rendering a second, detail depiction of the decision tree in a second region of the video display wherein the detail depiction of the decision tree is displayed as a plurality of interconnected nodes from a selected portion of the decision tree that convey information about a data set from the database;

displaying a control component within the overview depiction for navigating the decision tree; changing a position of said control component with respect to the overview depiction; adjusting the detail portion of the decision tree appearing within the second region of the video display based on a position of the control component; and changing the size of the control component based on the detail portion of the data structure appearing within said second region; and rendering in a third region of a video display text corresponding to a logic of the branches of the decision tree leading to the data nodes displayed in the detailed depiction.

* * * * *